(12) United States Patent
Guercio et al.

(10) Patent No.: US 8,858,036 B2
(45) Date of Patent: Oct. 14, 2014

(54) COMPACT CONCENTRIC ARRAY REFLECTOR FOR LED LIGHT FIXTURE

(71) Applicant: RAB Lighting Inc., Northvale, NJ (US)

(72) Inventors: Vincenzo Guercio, Wallkill, NY (US); Jiang Hu, Shanghai (CN); Dan Wang-Munson, Bergenfield, NJ (US)

(73) Assignee: RAB Lighting Inc., Northvale, NJ (US)

( * ) Notice: Subject to any disclaimer, the term of this patent is extended or adjusted under 35 U.S.C. 154(b) by 37 days.

(21) Appl. No.: 13/754,113

(22) Filed: Jan. 30, 2013

(65) Prior Publication Data
US 2013/0194808 A1    Aug. 1, 2013

Related U.S. Application Data

(60) Provisional application No. 61/593,300, filed on Jan. 31, 2012.

(51) Int. Cl.
*F21V 7/00* (2006.01)
*F21V 13/04* (2006.01)

(52) U.S. Cl.
CPC ............... *F21V 7/0025* (2013.01); *Y02B 20/72* (2013.01); *F21V 13/04* (2013.01)
USPC ............ 362/304; 362/305; 362/297; 362/346

(58) Field of Classification Search
USPC .......................... 362/304, 297, 302, 305, 346
See application file for complete search history.

(56) References Cited

U.S. PATENT DOCUMENTS

| | | | |
|---|---|---|---|
| 3,443,086 A | 5/1969 | Rikis | |
| 4,447,865 A | 5/1984 | VanHorn et al. | |
| 5,582,479 A | 12/1996 | Thomas et al. | |
| 5,768,339 A * | 6/1998 | O'Hara | 378/147 |
| 6,068,388 A | 5/2000 | Walker et al. | |
| 6,183,100 B1 | 2/2001 | Suckow et al. | |
| 6,623,143 B2 | 9/2003 | Anderson | |
| 6,679,618 B1 | 1/2004 | Suckow et al. | |
| 6,688,757 B2 | 2/2004 | Kovach et al. | |
| 7,014,341 B2 | 3/2006 | King et al. | |
| 7,125,147 B2 | 10/2006 | Waring | |
| 7,482,567 B2 | 1/2009 | Hoelen et al. | |
| 7,852,460 B2 * | 12/2010 | Bakker et al. | 355/67 |
| 8,033,683 B2 | 10/2011 | Fields | |
| 2002/0015307 A1 * | 2/2002 | Splane, Jr. | 362/304 |
| 2004/0165388 A1 * | 8/2004 | Shoji | 362/304 |
| 2011/0026249 A1 | 2/2011 | Wylde | |

OTHER PUBLICATIONS

Floodlighting Challenger 3 AL5900; catalog; pp. 79-81; www.abacuslighting.com.
GE Lighting Solutions; Evolve LED Area Light Contemporary Domed (EAMD); catalog; Apr. 4, 2011;4 pages; www.gelightingsolutions.com.

(Continued)

*Primary Examiner* — Laura Tso
(74) *Attorney, Agent, or Firm* — SmithAmundsen LLC; Kelly J. Smith; Dennis S. Schell

(57) ABSTRACT

An illustrative light fixture providing a desired spot light pattern diameter at a given distance includes a planar light emitter providing a light source and forming a first plane, and concentric conical frustum reflectors, the first reflector having a proximate end coplanar with the first plane and the second reflector having a proximate end distal of the first plane.

15 Claims, 5 Drawing Sheets

(56) References Cited

OTHER PUBLICATIONS

GE Lighting Solutions; Evolve LED Area Light Modular Fixture-Wall Pack & Egress (EWSW & EESW); catalog; Mar. 25, 2011; 4 pages; www.gelightingsolutions.com.

Compact Fluorescents, Surface Luminaires, S132 Series, S132 Surface Horizontal LouverLites; catalog; Nov. 9, 2011; pp. 62-63; WILA Lighting, LLC; Tustin, CA.

* cited by examiner

COMPACT CONCENTRIC ARRAY REFLECTOR FOR LED LIGHT FIXTURE

CROSS-REFERENCE TO RELATED APPLICATIONS

This application claims the benefit of U.S. Provisional Patent Application No. 60/593,300, filed Jan. 31, 2012, and titled COMPACT CONCENTRIC ARRAY REFLECTOR FOR LED LIGHT FIXTURE, which is incorporated herein by reference.

BACKGROUND

The present invention relates to light distribution features for light fixtures, and particularly, to providing a light fixture with a compact spot reflector system for small area light sources such as LEDs and LDs.

Traditional light sources for outdoor, industrial, office, or household lighting include incandescent, fluorescent, and high-intensity discharge (HID) lamps. Some of these traditional light sources provide a point or a linear lighting element; however, the glass enclosure around the element required that reflectors be displaced from the element. Therefore, with traditional light sources, reflectors often were required to extend around the light source in all three axes.

Newer highly efficient lighting technology, such as diode light sources, including LEDs or laser diodes (LDs), are generally arranged in a small area planar array, referred to as a light emitter or package. Such a light emitter may include a single chip containing one or more diode light sources, or may contain multiple chips.

A diode-type light emitter provides the added advantage that all of the light is directed outward from the planar array so that no reflector is required behind the array. In cases where the light emitter package contains one or more diodes on a single chip, the source of light is very, very small, so using a total internal reflection lens (TIR lens) is often practical. A TIR lens includes facets on the entry face (diode/chip side) of the lens that are positioned and angled to redirect all the light incident from the entry face toward the exit face; however, TIR lenses have shortcomings when designed for multi-chip light emitters; therefore, even though the source of light is still closer to a point source than for traditional lighting sources, traditional reflectors are often used to redirect the light as desired in light emitters using multiple chips.

One common requirement for redirecting traditional lighting or light emitter sources is providing a spot distribution pattern. One prior art solution used for limiting the distribution in traditional lighting is a curved conical frustum reflector, for example, with a parabolic profile, providing redirection of light; however, the smaller the desired spot at a given range from the light fixture, the longer the length the reflector must extend from the light source in order to obtain the desired beam distribution and minimize spill light. Another prior art reflector system for traditional lighting provides a pair of concentric reflectors having cylindrical profiles, each with a different diameter. Such a reflector system does shape the light beam to a spot; however, such a system can be inefficient if less expensive reflectors are used, because a given light ray is reflected multiple times before escaping out the distal end of the reflector.

Another prior art reflector system for traditional lighting provides nested concentric reflectors; however, such reflector systems are not designed for a point or near point light source as is provided by modern diode-type light emitters, but rather are designed for a linear or area light source. Such a reflector system designed for area light sources combined with a diode-type light emitter does not efficiently or effectively redirect light to a desired spot pattern and would therefore require a higher output light emitter than preferred in order to provide the desired lumens for the desired spot distribution pattern, thus undermining the energy efficiency that is possible with diode-type light emitters.

Therefore, it is desirable to provide a light fixture reflector system that is structured to provide the redirection necessary from a very small, point or near point light source, sustaining the efficiency advantages available with diode-type light emitter package, while also providing the desired spot distribution pattern and minimizing spill light.

SUMMARY

The present invention may comprise one or more of the features recited in the attached claims, and/or one or more of the following features and combinations thereof.

An illustrative embodiment of the light fixture providing a desired spot light pattern diameter at a given distance distally from a light source includes a planar light emitter providing the light source, forming a first plane, and defining a centroid of the light source; a first parabolic conical frustum reflector having a proximate end coplanar with the first plane, and a distal end, the length between the proximate and distal end and the diameter of the distal end providing the desired spot light pattern diameter at the given distance; and a second parabolic conical frustum reflector located within the first parabolic conical frustum reflector and having a proximate and distal end, the proximate end being distal of the first plane and having a diameter smaller than the diameter of the distal end.

In one embodiment the proximate end of the second parabolic conical frustum can be located at an intersection with a first hypothetical cone intersecting the centroid of the light source and the distal end of the first parabolic conical frustum reflector, and the distal end of the second parabolic conical frustum can be located at an intersection with a second hypothetical cone intersecting the centroid of the light source and the desired spot light pattern diameter at the given distance.

The distal ends of the first and the second parabolic conical frusta can be coplanar. The planar light emitter can define an array having a diameter smaller than the diameter of the distal end of the second parabolic conical frustum. The first and the second parabolic conical frusta can be structured to reflect light only in a direction distal to the planar light emitter. Another embodiment of the light fixture can further include a third parabolic conical frustum reflector located within the second parabolic conical frustum reflector.

An embodiment of the light fixture can further include a single lens, the lens spanning the first and the second parabolic conical frusta and positioned at the distal end of the first parabolic conical frustum, and a light housing having a first cylinder located coaxially around the first parabolic conical frustum. The light housing can further include a second cylinder located coaxially around the first cylinder and defining an open annular channel therebetween.

Additional features of the disclosure will become apparent to those skilled in the art upon consideration of the following detailed description of the illustrative embodiment.

BRIEF DESCRIPTION OF THE DRAWINGS

The detailed description particularly refers to the accompanying figures in which.

DESCRIPTION OF THE ILLUSTRATIVE EMBODIMENTS

Figure 1:
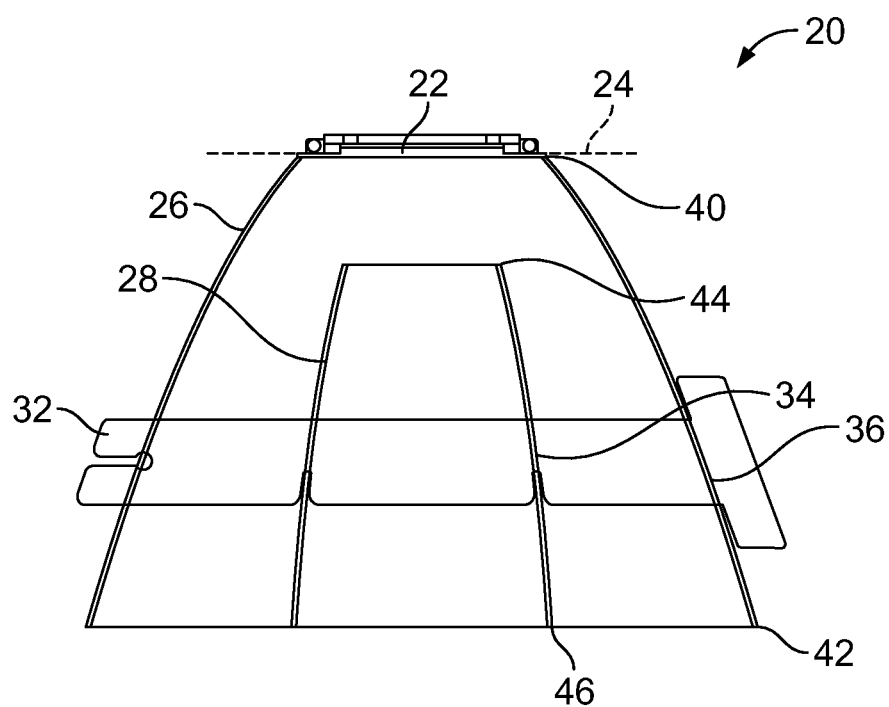
FIG. 1 is a cross-sectional side view of a first embodiment of a light fixture according to the present invention.

For the purposes of promoting and understanding the principals of the invention, reference will now be made to one or more illustrative embodiments illustrated in the drawings and specific language will be used to describe the same.

Referring to FIGS. 1, a first illustrative embodiment of a light fixture 20 according to the present invention is shown. The light fixture 20 is structured to provide a desired spot light pattern diameter at a given distance and includes a light source comprising a planar light emitter 22, forming a first plane 24. The cross-sectional side view is taken along a cutting plane located in the center of the light fixture 20 and emitter 22, and perpendicular to the first plane 24, for example, as shown for a fourth embodiment in the cross-sectional perspective view of FIG. 5. The light fixture 20 further includes a first reflector 26 that defines a first parabolic conical frustum, and a second reflector 28 positioned concentrically within the first reflector and defining a second parabolic conical frustum. The second reflector 28 can be supported within the first reflector 26 with a support 32, for example a flat metal strap oriented vertically (perpendicular to first plane 24) to minimize the blockage of light, and coupling the reflectors 26 and 28 at slots 34 and 36 defined vertically within reflectors 26 and 28, respectively.

A proximate end 40 of the first reflector 26 is coplanar or substantially coplanar with the first plane 24. In this embodiment, a proximate end 44 of the second reflector 28 is located distal of the first plane 24 and the respective distal ends 42 and 46 of the first and second reflectors 26 and 28 are coplanar.

Figure 2:
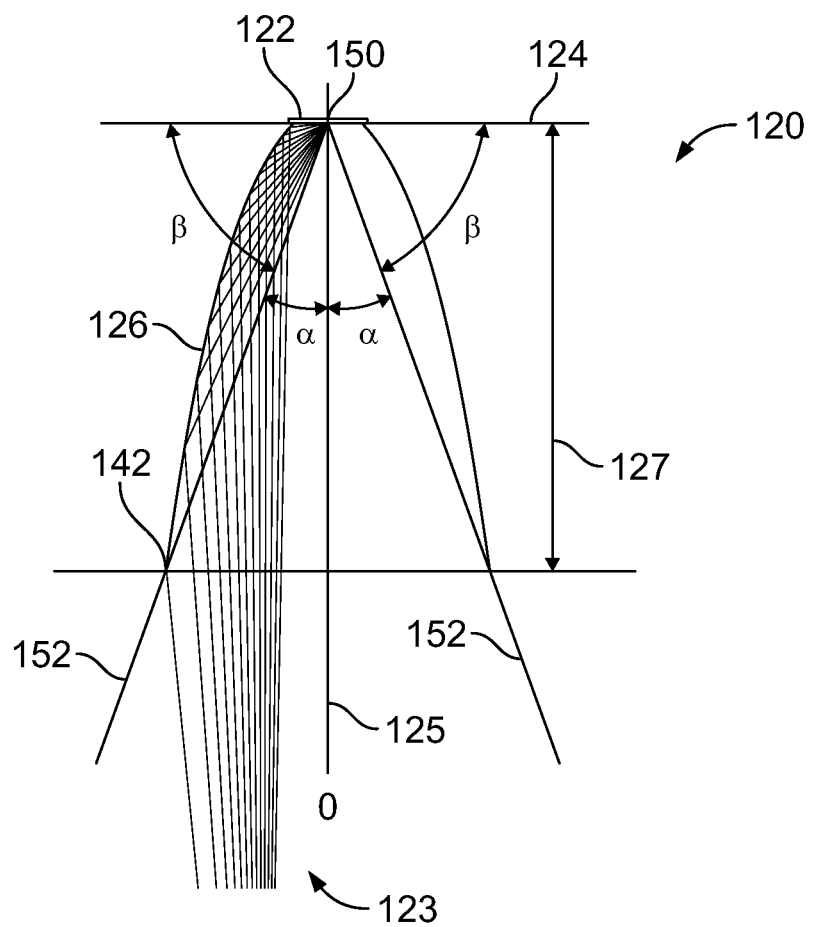
FIG. 2 is a schematic cross-sectional side view of a prior art light fixture.

To understand the advantages of the above and below discussed embodiments, it is helpful to consider a prior art light fixture design 120, illustrated in the cross-sectional side view of FIG. 2. The prior art design 120 includes a planar light emitter 122 and a single parabolic reflector 126 that directs the light rays from emitter 122 at desired angles. For example, the reflector 126 reflects and redirects all light 123 emitted by the emitter 122 in the beam angle range β-beta defined between the plane 124 and a hypothetical cone 152. The vertex of the hypothetical cone 152 is collocated with centroid 150 of the light emitted by the emitter 122, and the surface of the hypothetical cone 152 intersects with the distal end 142 of the reflector 126. The light emitted from emitter 122 that falls within the hypothetical cone 152 (within angle α-alpha) projects outward in a distal direction from the plane 124 without reflecting on reflector 126, and the light emitting from emitter 122 in a distal direction between cone 152 and plane 124 (within angle β-beta) is redirected by reflecting off of reflector 126, as is illustratively shown for light 123 in FIG. 2.

Thus, the total light output from the prior art design 120 is made up of two parts, the light 123 reflected to about 0 degrees (line 125, perpendicular to the plane 124) by the reflector 126, and the light emitted directly from the emitter 122 and within the beam angle range α-alpha, which is within the hypothetical cone 152. To obtain a tight distribution desired for a spotlight type system, for example a 1H1V standard defined by the National Electrical Manufacturers Association (NEMA), the angle α-alpha is about 20 degrees or less. To improve the visual effect of the spotlight by reducing light spill from the prior art design 120, the angle α-alpha is preferably about 10 degrees or less. To obtain such a desired light effect, the length 127 of the reflector 126 must be extended distally beyond what is often desired aesthetically, what will fit in some installations, and what is cost-effective.

Figure 3:
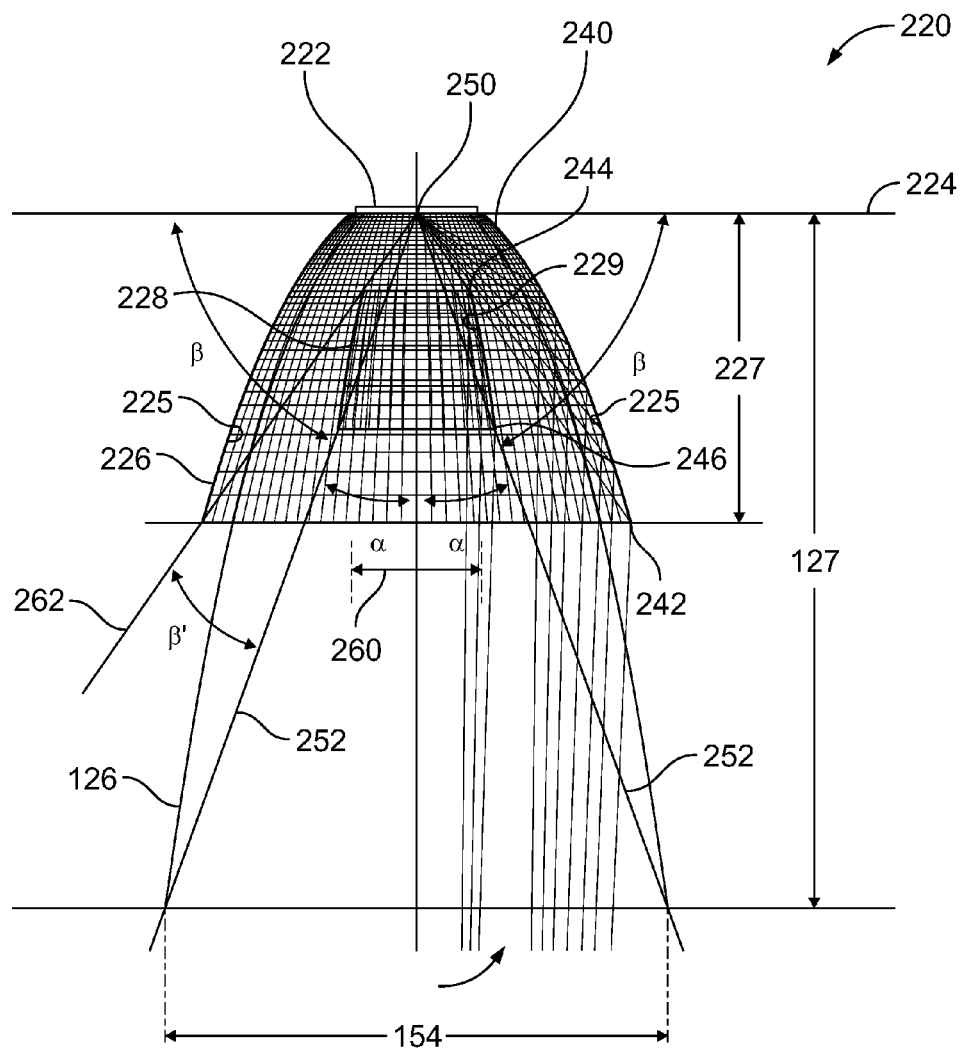
FIG. 3 is a cross-sectional side view of a second embodiment of a light fixture according to the present invention.

Referring to FIG. 3, a second embodiment of a light fixture 220 according to the present invention is shown. The cross-sectional side view of FIG. 3 is taken along a cutting plane located in the center of the light fixture 220 and emitter 222, and perpendicular to a first plane 224, for example, the same cutting plane as for a fourth embodiment in the cross-sectional perspective view of FIG. 5. FIG. 3 includes an overlay of reflector 126 of the prior art design 120 to illustrate that the light fixture 220 provides the same light pattern diameter 154 at a distance 127 from the first plane 224, as does light fixture 120, yet light fixture 220 has a first reflector 226 with a length of only 227, less than half that of length 127. In the light fixture 220, two concentric parabolic conical frustum reflectors 226 and 228 provide a nested concentric reflector array that redirects the light as desired with reduced overall reflector length.

More specifically, the second reflector 228 has a distal end 246 positioned and having a diameter 260 providing no obstruction to direct light from the emitter 222 within the first hypothetical cone 252 in the beam range α-alpha, which provides the desired light pattern diameter 154 at distance 127 from the emitter 222 as was provided by reflector 126 of light fixture 120. The first hypothetical cone 252 has a vertex collocated with the centroid 250 of the light emitter 222 and with a surface that intersects the distal end 246 of the second reflector 228, and the diameter 154 at distal distance 127. The interior surface 229 of the second reflector 228 extends between the proximate end 244 and the distal end 246 and reflects light to the distal spot desired that is emitted from the emitter 222 in the beam angle ranges β'-beta prime, which is the area between the first hypothetical cone 252 and a second hypothetical cone 262.

The second hypothetical cone 262 has a vertex collocated with the centroid 250, and a surface that intersects both the proximate end 244 of the second reflector 228, and the distal end 242 of the first reflector 226. Thus, reflecting of light 223 by the first reflector 226 requires that the proximate end 244 of the second reflector 228 be positioned distally of the first plane 224. The interior surface 225 of the first reflector 226 reflects the light emitted from the emitter 222 outside of the second hypothetical cone, which is in the beam angle range β-beta, which extends between β'-beta prime and the plane 224. Additionally, the diameters defined by the distal ends 242 and 246 of the respective reflectors 226 and 228, each have a diameter larger than the diameter of the respective proximate ends 240 and 244.

Figure 4:
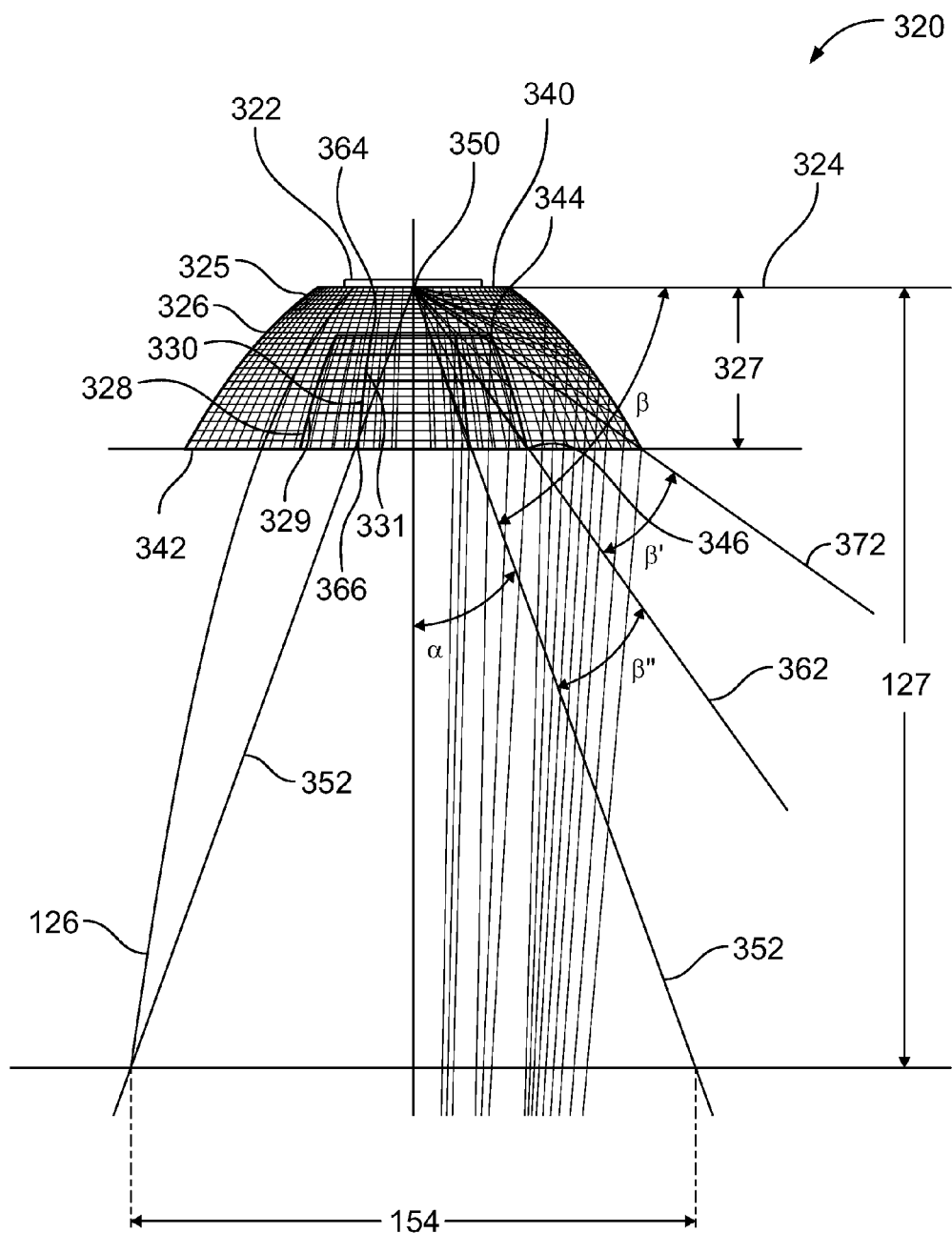
FIG. 4 is a cross-sectional side view of a third embodiment of a light fixture according to the present invention.

Referring to FIG. 4, a third embodiment of a light fixture 320 according to the present invention is shown. The cross-sectional side view of FIG. 4 is taken along a cutting plane located in the center of the light fixture 320 and emitter 322, and perpendicular to a first plane 324, for example, the same as the cutting plane used in illustrated a fourth embodiment in the cross-sectional perspective view of FIG. 5. FIG. 3 includes an overlay of reflector 126 of the prior art design 120 to illustrate that the light fixture 320 provides the same light pattern diameter 154 at a distance 127 from the first plane 324 as does the prior art light fixture 120, yet the light fixture 320 has a first reflector 326 length, the longest reflector, of only 327, less than a quarter that of length 127 for reflector 126. In the light fixture 320, three concentric parabolic conical frustum reflectors 326, 328, and 330 provide reflective surfaces that reduce the reflector length needed over the prior art to provide the same light pattern diameter 154 at distal distance 127.

More specifically, the third reflector 330 has a distal end 366 positioned and having a diameter providing no obstruction to the light rays emitted from the emitter 322 within the first hypothetical cone 352 in the beam range α-alpha, which provides the desired light pattern diameter 154 at distance 127 from the emitter 322. The first hypothetical cone 352 has a vertex collocated with the centroid 350 of the light emitter 322 and a surface that intersects the distal end 366 of the third reflector 330, and the diameter 154 at distal length 127. The interior surface 331 between the proximate end 364 and the distal end 366 of the third reflector 330 provides reflection of the light in the beam angle range β"-beta double prime, which is between the first hypothetical cone 352 and a second hypothetical cone 362. The second hypothetical cone 362 has a vertex collocated with the centroid 350, and a surface that intersects the proximate end 364 of the third reflector 330, and the distal end 346 of the second reflector 328.

The interior surface 329 of the second reflector 328 reflects light emitting from the emitter 122 in the beam angle range α'-beta prime, which is between a third hypothetical cone 372 and the second hypothetical cone 362. The third hypothetical cone 372 has a vertex collocated with the centroid 350, and a surface that intersects with the proximate end 344 of the second reflector 328, and the distal end 342 of the first reflector 326. Thus, in order to reflect light emitted by the emitter 322 between hypothetical cone 372 and plane 324, the proximate end 344 of the second reflector 328 must be be positioned distally of the first plane 324. The interior surface 325 of the first reflector 326 provides reflected light in the beam angle ranges β-beta minus β'-beta prime and minus β"-beta double prime, which is between the plane 324 and the third hypothetical cone 372.

In the third embodiment of the light fixture 320, the distal ends 342, 346, and 366 of the respective reflectors 326, 328, and 330 are coplanar. In addition, the proximate ends 344 and 364 of the respective reflectors 328 and 330 are coplanar and positioned distally of the first plane 324. Additionally, the diameters defined by the distal ends 342, 346, and 366 of the respective reflectors 326, 328, and 330 that are coplanar and that each have a diameter larger than the diameter of the respective proximate ends 340, 344, and 364. The proximate ends 344 and 364 of reflectors 328 and 330 are coplanar and are distal of the proximate end of the first reflector 326, which is coplanar with the first plane 324.

Figure 5:
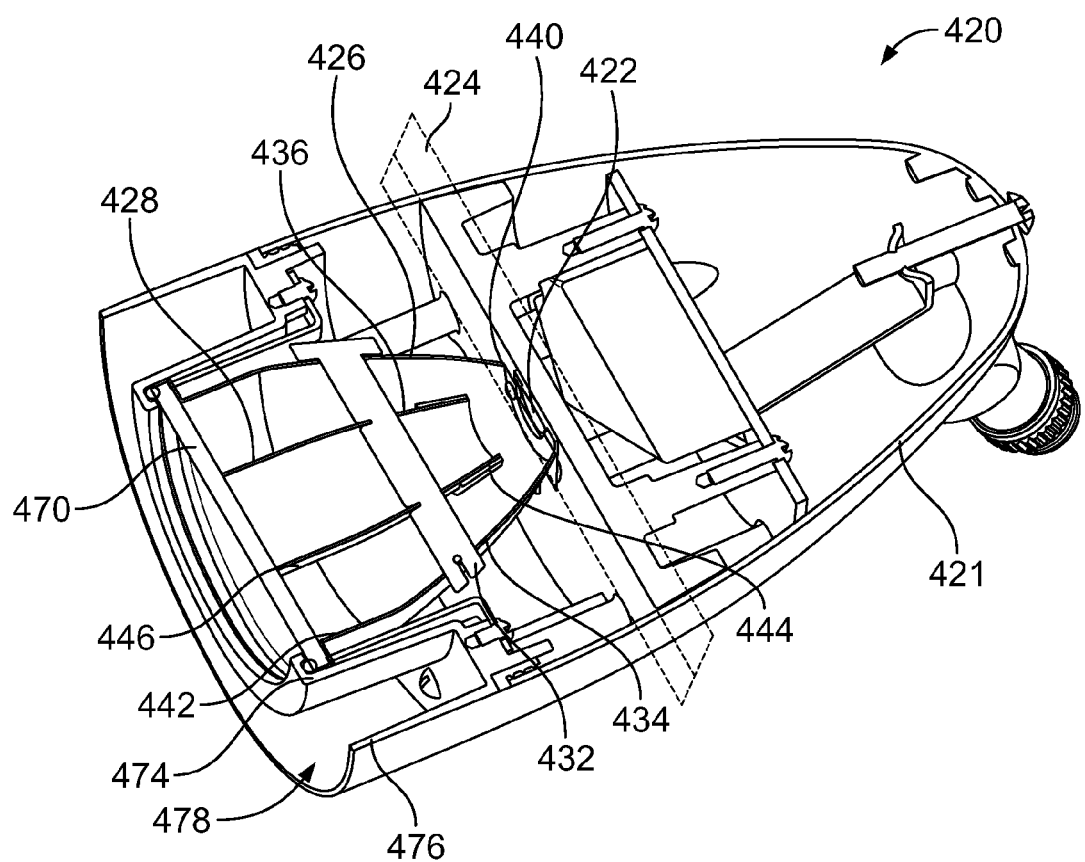
FIG. 5 is a cross-sectional perspective view of a fourth embodiment of the light fixture according to the present invention.

Referring to FIGS. 5, a fourth illustrative embodiment of a light fixture 420 according to the present invention is shown. The light fixture 420 is structured to provide a desired spot light pattern diameter at a given distance and includes a light source comprising a planar light emitter 422, forming a first plane 424. The light fixture 420 further includes a housing 421, a first reflector 426 that defines a first parabolic conical frustum, and a second reflector 428 positioned concentrically within the first reflector and defining a second parabolic conical frustum. The second reflector 428 can be supported within the first reflector 426 with a support 432, for example a flat metal strap oriented vertically (perpendicular to first plane 424) to minimize the blockage of light, and coupling the reflectors 426 and 428 at slots 434 and 436 defined vertically within reflectors 426 and 428, respectively.

A proximate end 440 of the first reflector 426 is coplanar, about coplanar, or substantially coplanar with the first plane 424. In this embodiment, a proximate end 444 of the second reflector 428 is located distal of the first plane 424 and the respective distal ends 442 and 446 of the first and second reflectors 426 and 428 are coplanar.

The light fixture 420 further includes a single lens 470, the lens spanning the first and the second reflectors 426 and 428 and positioned at the distal end 442 of the first reflector 426. The light fixture 420 includes a first cylinder 474 located coaxially around the first reflector 426 and the light housing 421 includes a second cylinder 476 located coaxially around the first cylinder 474 and defining an open annular channel 478 therebetween.

While the invention has been illustrated and described in detail in the foregoing drawings and description, the same is to be considered as illustrative and not restrictive in character, it being understood that only illustrative embodiments thereof have been shown and described and that all equivalents and all changes and modifications known in the art that come within the spirit and scope of the invention as defined herein are desired to be protected.

The invention claimed is:

1. A light fixture providing a desired spot light pattern diameter at a given distance, comprising:
    a planar light emitter providing a light source, forming a first plane, and defining a centroid of the light source;
    a first conical frustum reflector having a proximate end coplanar with the first plane, and a distal end; and
    a second conical frustum reflector located concentrically within the first conical frustum reflector and having a proximate and distal end, the proximate end being distal of the first plane and having a diameter smaller than a diameter of the distal end;
    the proximate end of the second conical frustum reflector is located at an intersection with a surface of a first hypothetical cone having a vertex at the centroid of the light source and the first hypothetical cone surface further intersecting the distal end of the first conical frustum reflector;
    the distal end of the second conical frustum reflector is located at an intersection with a surface of a second hypothetical cone having a vertex at the centroid of the light source and the second hypothetical cone surface further intersecting the desired spot light pattern diameter at the given distance; and
    wherein the combination of the first and second conical frustum reflectors directs the light source to the desired spot light pattern diameter at the given distance.

2. The light fixture of claim 1, further comprising a lens, the lens spanning the first and the second conical frustum reflectors and positioned at the distal end of the first conical frustum reflector.

3. The light fixture of claim 1, wherein the distal ends of the first and the second parabolic conical frustum reflectors are coplanar.

4. The light fixture of claim 1, wherein the distal end of the first conical frustum reflector is distal of the distal end of the second conical frustum reflector.

5. The light fixture of claim 1, wherein the planar light emitter defines an array having a diameter smaller than the diameter of the distal end of the second conical frustum reflector.

6. The light fixture of claim 1, wherein the planar light emitter defines an array having a diameter smaller than a diameter of the proximate end of the first conical frustum reflector.

7. The light fixture of claim 1, wherein the first and the second conical frustum reflectors reflect light only in a direction toward the given distance distal of the planar light emitter.

8. The light fixture of claim 1, further comprising a light housing having a first cylinder located coaxially around the first conical frustum reflector.

9. A light fixture providing a desired spot light pattern diameter at a given distance, comprising:
   a planar light emitter providing a light source, forming a first plane, and defining a centroid of the light source;
   a first conical frustum reflector having a proximate end coplanar with the first plane, and a distal end;
   a second conical frustum reflector located concentrically within the first conical frustum reflector and having a proximate and distal end, the proximate end being distal of the first plane and having a diameter smaller than a diameter of the distal end;
   wherein the combination of the first and second conical frustum reflectors directs the light source to the desired spot light pattern diameter at the given distance; and
   the light fixture further comprising a light housing having a first cylinder located coaxially around the first conical frustum reflector;
   wherein the light housing further includes a second cylinder located coaxially around the first cylinder and defining an open annular channel therebetween.

10. The light fixture of claim 9, wherein the light housing further includes a surface closing the open annular channel at a depth located between the distal and proximate ends of the first conical frustum reflector.

11. The light fixture of claim 1, wherein at least one of the first and second conical frustum reflectors are parabolic.

12. A light fixture providing a desired spot light pattern diameter at a given distance, comprising:
   a planar light emitter providing a light source, forming a first plane, and defining a centroid of the light source;
   a first conical frustum reflector having a proximate end coplanar with the first plane, and a distal end;
   a second conical frustum reflector located concentrically within the first conical frustum reflector and having a proximate and distal end, the proximate end being distal of the first plane and having a diameter smaller than a diameter of the distal end;
   wherein the combination of the first and second conical frustum reflectors directs the light source to the desired spot light pattern diameter at the given distance; and
   a third conical frustum reflector located concentrically within the second conical frustum reflector, and wherein the combination of the first, second, and third conical frustum reflectors directs the light source to the desired spot light pattern diameter at the given distance.

13. The light fixture of claim 12, wherein:
   the proximate end of the second conical frustum reflector is located at an intersection with the surface of a first hypothetical cone having a vertex at the centroid of the light source and the surface further intersecting the distal end of the first conical frustum reflector;
   the distal end of the second conical frustum reflector is located at an intersection with the surface of a second hypothetical cone having a vertex at the centroid of the light source and the surface further intersecting the proximate end of the third conical frustum reflector; and,
   the distal end of the third conical frustum reflector is located at an intersection with the surface of a third hypothetical cone having a vertex at the centroid of the light source and the surface further intersecting the desired spot light pattern diameter at the given distance.

14. The light fixture of claim 13, wherein the proximate ends of the second and third conical frustum reflectors are coplanar and are located distal of the first plane.

15. The light fixture of claim 13, wherein the distal ends of the first, second, and third conical frustum reflectors are coplanar.

* * * * *